(12) United States Patent
Dao et al.

(10) Patent No.: US 8,651,821 B2
(45) Date of Patent: Feb. 18, 2014

(54) DEVICE FOR FASTENING A VARIABLE PITCH BLADE

(75) Inventors: Daniel Bernard Dao, Savigny le Temple (FR); Adrien Jacques Philippe Fabre, Montrouge (FR); Alain Paul Madec, Chartrettes (FR)

(73) Assignee: SNECMA, Paris (FR)

( * ) Notice: Subject to any disclaimer, the term of this patent is extended or adjusted under 35 U.S.C. 154(b) by 600 days.

(21) Appl. No.: 13/002,437

(22) PCT Filed: Jul. 16, 2009

(86) PCT No.: PCT/EP2009/059194
§ 371 (c)(1),
(2), (4) Date: Jan. 3, 2011

(87) PCT Pub. No.: WO2010/007146
PCT Pub. Date: Jan. 21, 2010

(65) Prior Publication Data
US 2011/0110781 A1    May 12, 2011

(30) Foreign Application Priority Data

Jul. 18, 2008   (FR) ...................................... 08 54912

(51) Int. Cl.
*B64C 11/06*   (2006.01)
(52) U.S. Cl.
USPC ...................................... 416/221; 416/220 A

(58) Field of Classification Search
USPC .............. 416/147, 220 A, 220 R, 221, 219 R, 416/204 R, 205
See application file for complete search history.

(56) References Cited

U.S. PATENT DOCUMENTS

| | | | |
|---|---|---|---|
| 2,971,744 A * | 2/1961 | Szydlowski | 416/221 |
| 4,047,840 A * | 9/1977 | Ravenhall et al. | 416/135 |
| 5,163,817 A * | 11/1992 | Violette et al. | 416/204 A |
| 5,263,898 A | 11/1993 | Elston et al. | |
| 5,350,279 A * | 9/1994 | Prentice et al. | 416/220 R |

OTHER PUBLICATIONS

International Search Report Issued Oct. 6, 2009 in PCT/EP09/059194 filed Jul. 16, 2009.

* cited by examiner

*Primary Examiner* — Edward Look
*Assistant Examiner* — Danielle M Christensen
(74) *Attorney, Agent, or Firm* — Oblon, Spivak, McClelland, Maier & Neustadt, L.L.P.

(57) ABSTRACT

This blade attachment device comprises a shell (28) installed around an outer collar (23) of the pivot (15) of the blade (27) and capable of rotating by an angle sufficient for cleats (30, 31) to close the ends of the pivot groove and retain the root of the blade (27) in it, and mobile shims that cooperate to retain the root in the groove.
Application to aircraft engines.

8 Claims, 5 Drawing Sheets

US 8,651,821 B2

DEVICE FOR FASTENING A VARIABLE PITCH BLADE

BACKGROUND OF INVENTION

The subject of the invention is a device for fastening a variable pitch blade.

Many propeller blades have a variable pitch to optimise their operation. The blade is then extended by a pivot rotating in a housing in the propeller hub, or more generally in a support part. The blade and the pivot are often separate parts, the blade being composed of a composite material to save weight, the pivot remaining metallic to resist the forces applied to it. In a number of designs, the pivot is then built into the blade which is moulded over it, and the two parts are therefore inseparable. This is satisfactory in some aspects, but it has the disadvantages that manufacturing is more complicated and that the blade is thicker because it needs to surround the pivot; and continuity between the bottom of the blade and the support part in which the pivot is housed is not good, which creates aerodynamic losses. Other designs consist of constructing the blade and the pivot separately, and holding them together by a dovetail.

One known design of this type is shown in FIGS. 1 and 2 (or in U.S. Pat. No. 5,263,898). A propeller hub 1 comprises a circular housing in which a pivot 2 is housed, to rotate a blade 3. A groove 4 with a dovetail section and a root 5 of the blade 3 with a corresponding section are shown. Turning is possible due to the roller bearings 6 and the thrust bearings 7 between the hub 1 and the pivot 2. The root 5 of the blade 3 is held in place in the groove 4 firstly by a shim 8 inserted in the groove 4 and secondly by a shim 11 held in place by bolts 12 extending in the pivot 2 parallel to the groove 4 and on each side of it. The bolts 12 are also used to hold the shim 11 in contact with spring 61 positioned in the groove 4 under the root 5 and the function of which is to hold the blade 3 radially in place when the centrifugal force is not sufficient to keep the root 3 in contact with the groove 4, particularly when stopped. The spring 61 is slightly curved at rest and the bearing of the shim 11 applies a deformation curvature on it which holds the blade 3 in position. A toothed ring 60 is held in place around the pivot 2 mainly by a locking sector 13 that closes the ring to which it is screwed, and which is also held in place by bolts 12, supporting the shim 11 from behind. In this design, the pivot 2 may be easily provided with an upper circular platform 14, that projects in the radial direction beyond the main portions of the pivot and the function of which is to restore continuity of the boundary of the air stream.

However, this design has the disadvantage that it requires a large number of parts to hold the blade in the groove. One purpose of the invention is to propose an improvement and thus to facilitate attachment, disassembly or replacement of the blade, and saving weight.

BRIEF SUMMARY OF INVENTION

In one general definition, the invention relates to a variable pitch blade device comprising a blade, a pivot with an upper groove in which a root of the blade is mounted, and means of retaining the root of the blade in the groove, characterised in that said means comprise shims inserted in the groove and that stop in contact with the blade root, and a shell inserted around the pivot and provided with attachment points to the pivot, and facing cleats closing the groove.

The shell is the essential element of the invention; all that is necessary is to slide it around the pivot and fix it to the pivot so that the shell will close the ends of the groove and prevent movements of the blade in both directions, cooperating with the clamping shims which are placed in the groove without needing to be fixed to it. In prior design, the ring is discontinuous and is interrupted in front of the groove and the locking sector must be assembled with it to close the groove; and it does not participate in holding the blade on the other side either, since it is separated from the shim 11; it does not have any of the cleats on the shell according to the invention.

The shell may be approximately circular in shape provided with a flat on which one of the cleats is installed.

The shims may include a retaining shim preventing the root of the blade from sliding in the groove, and a blade root support shim placed on the bottom of the groove, which is a particularly simple arrangement to stop and complement movements of the blade root in the groove.

BRIEF DESCRIPTION OF DRAWINGS

These and other aspects of the invention will now be described in more detail with reference to the following figures:

and the other

FIG. 3 shows the isolated pivot,

FIG. 4 the assembly of the blade root and the shell on the seal in its condition before assembly, FIG. 5 the assembled state of these parts, FIG. 6 a locking shim, FIG. 7 the assembly of the shims, FIG. 8 the half-platforms covering the joint, FIG. 9 the assembly with the half-platforms and FIG. 10 the isolated shell.

DETAILED DESCRIPTION OF INVENTION

Figure 3:
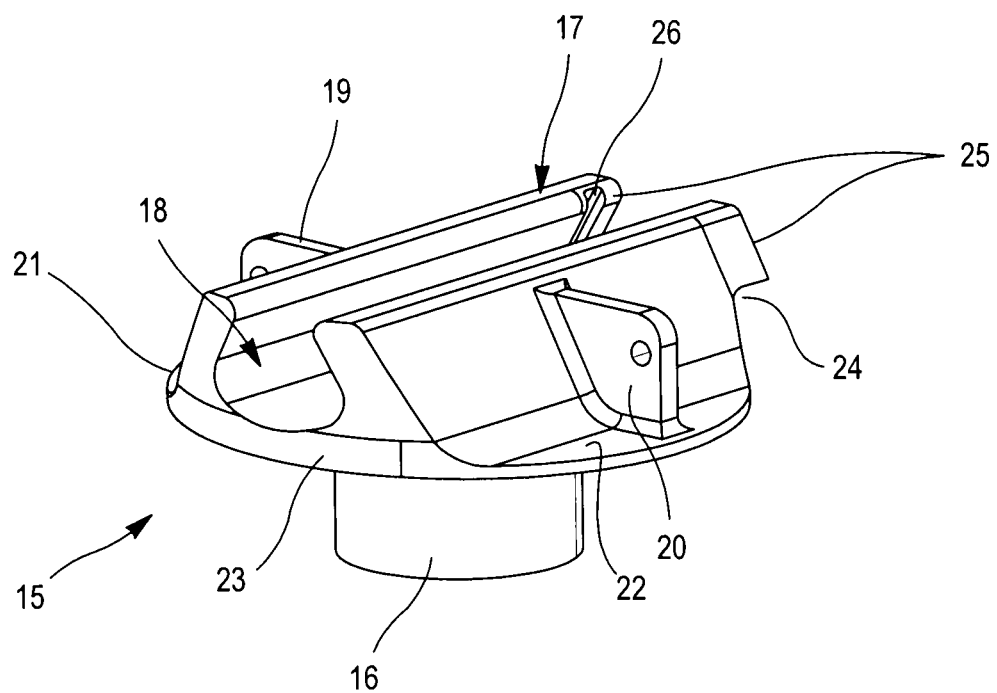
FIGS. 3 to 10 illustrate the invention.

The pivot appears isolated in FIG. 3; it is denoted reference 15 and it comprises a main part 16 (only schematically shown, because the invention does not apply to it), and an upper part 17 through which the blade is attached and which includes the groove 18. Furthermore, two opposite tabs 19 and 20 in line with each other stand on each side of the groove 18, on side plates 21 and 22. The contour of the largest part of the upper part 17 is circular and forms a collar 23. However, there is a chase 24 formed on one side of the groove 18, and the upper parts of its lips that delimit it form overhangs 25; notches 26 facing each other are formed in the inner edges of the overhangs 25, thus being arranged beyond the bottom of the groove 18.

Figure 4:
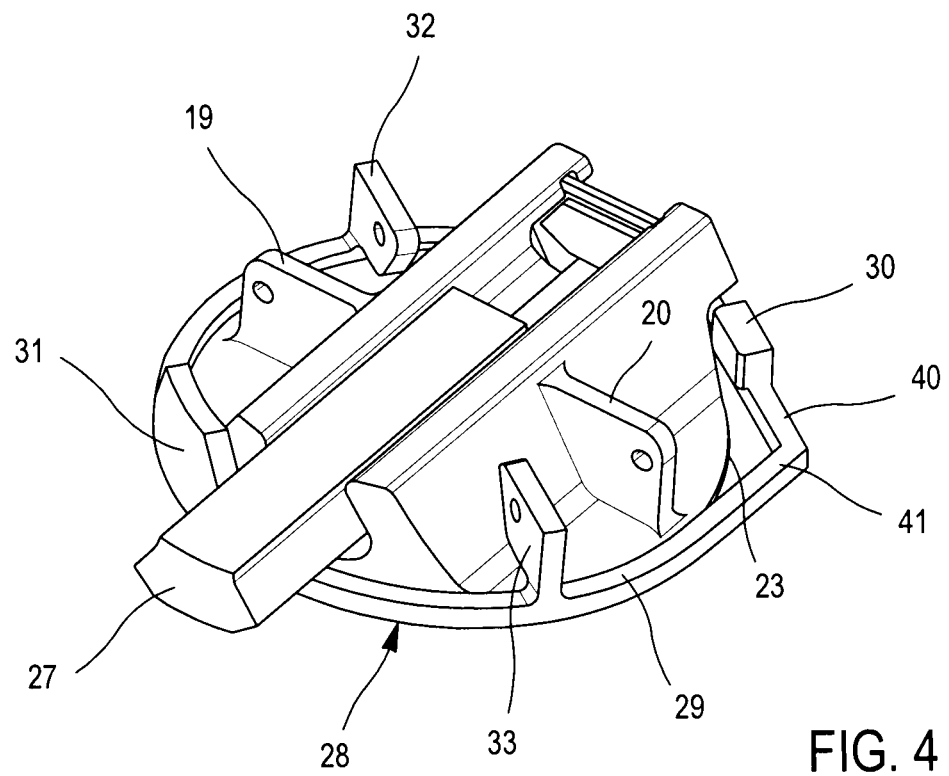

Two other elements of the assembly are shown in FIG. 4, which we will now describe. The root of a blade 27 is slid into the groove 18, and a shell 28 is inserted around the collar 23. The blade 27 (also shown partially) and its root are conventional. The shell 28 comprises an approximately continuous circular hoop 29 in the angular direction of the pivot 15, two cleats 30 and 31 fixed to the hoop 29 at diametrically opposite positions of it, and two attachment tabs 32 and 33 themselves fixed to the hoop 29 at diametrically opposite positions from each other but perpendicular to the positions of the cleats 30 and 31. The cleats 30 and 31 and the attachment tabs 32 and 33 rise above the hoop 29, and the tabs 32 and 33 project radially inwards, while the cleats 30 and 31 do not.

Figure 1:
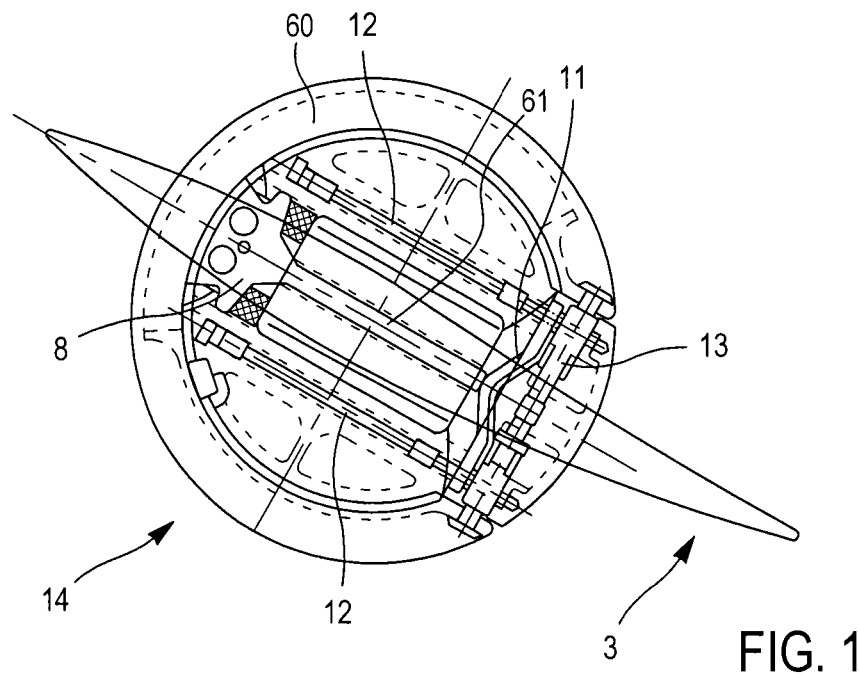
FIGS. 1 and 2 already described show a top view and a diametric sectional view of a blade attachment device according to prior art.
Figure 2:
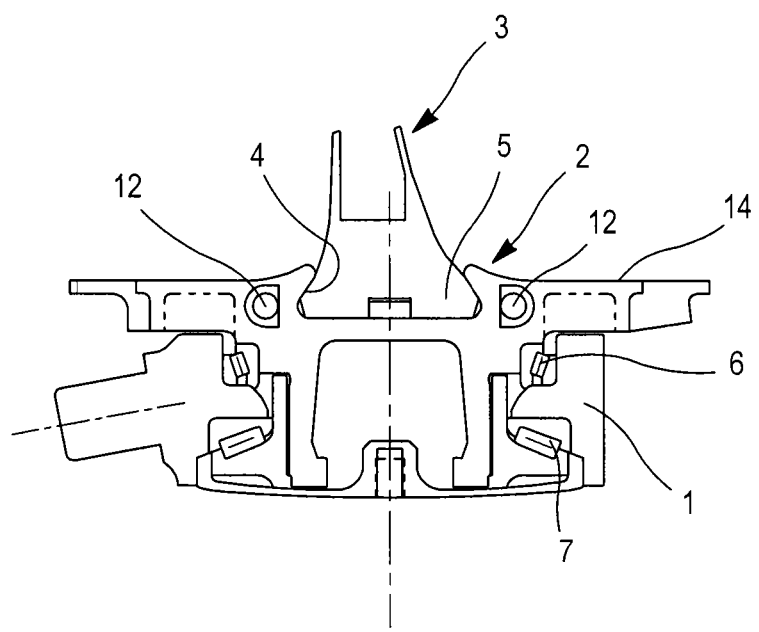
Figure 5:
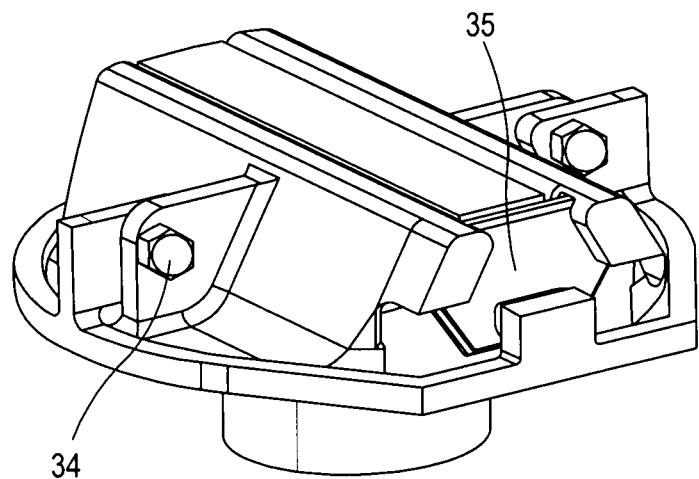

The shell 28 can rotate around the pivot 15, the hoop 29 is sliding on the collar 23. Since the tabs 19 and 20 of the pivot 15 extend perpendicular to the groove 18, the state that can be obtained is described below. An appropriate rotation of the shell 28 forces the tabs 32, 33 into contact with the bearing faces of the tabs 19 and 20 respectively of the pivot 15, while the cleats 30 and 31 stand out facing the ends of the groove 18 to close them. This prevents the blade 27 from coming out of the groove 18. The tabs 19, 20, 32 and 33 are provided with drillings that are in line with each other when one tab is placed on the other, so that the shell 28 can be fixed to the pivot 15 by bolts 34, as shown in FIG. 5. It can be seen that this assembly system is much simpler than the assembly system shown in FIGS. 1 and 2. Other features of the embodiment will now be described.

Figure 6:
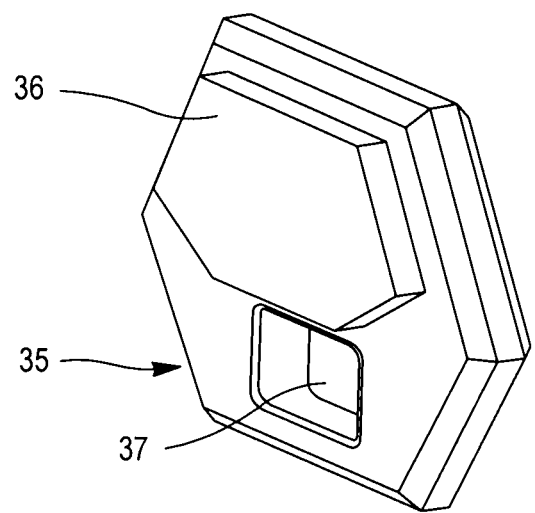
Figure 7:
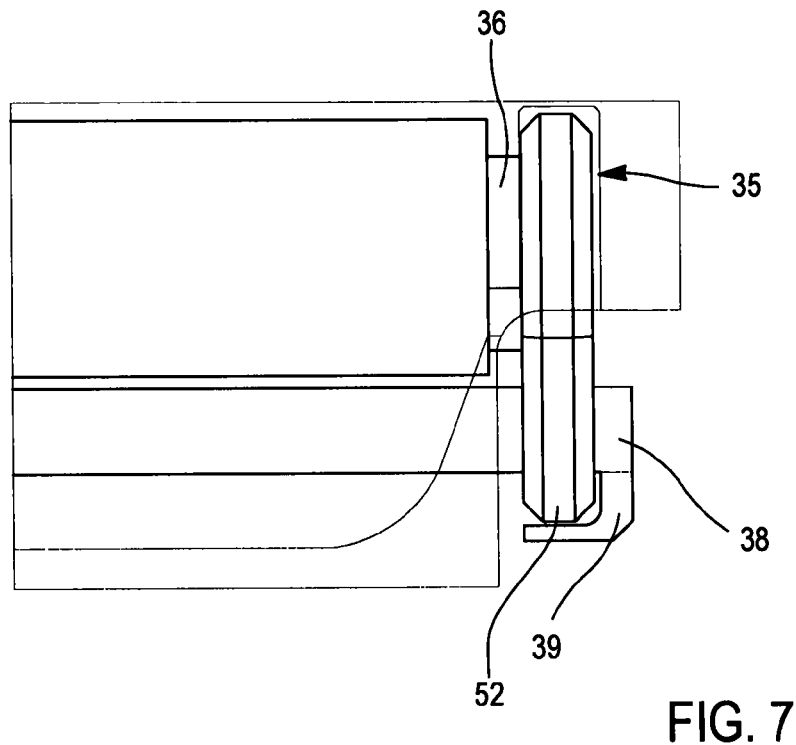

Two shims are added to the device to hold the blade 27 in the groove 18 of the pivot 15 at a determined position. They are shown in FIGS. 6 and 7. One is a locking shim 35 designed to hold the root of the blade 27 and prevent it from sliding in the groove 18. It is usually plane with a polygonal section, and it is inserted into the notches 26. It comprises a bearing face 36 to support the root of the blade 27 in an upper part, and a drilling 37 in a lower part. This locking shim 35 is composed partly of a rigid material (metallic or composite) and partly of a deformable material (for example at the bearing face 36), so that the locking shim 35 can absorb energy during impact of a foreign body on the blade 27 and therefore reduce the forces applied to the root of the blade 27. The drilling 37 is designed to hold the second shim which is a support shim 38 for the root of the blade 27 placed at the bottom of the groove 18. It is in the shape of a flat rod. Its end passes through the drilling 37, and it comprises a hook 39 curved downwards and towards the pivot 15, which extends under the locking shim 35 thus surrounding a tab 52. The shims 35 and 38 are free parts, with no assembly means such as bolts to other parts and that are held in place only by blocking, which increases the required simplicity of the design.

With reference once again to FIGS. 4 and 5, it can be seen that the sizes of the cleats 30 and are unequal, and that the radius of hoop 29 is larger at the location of the smallest cleat 30, where the hoop is formed into the shape of a flat 40 at the end of straight extension portions 41. These arrangements make it possible to complete the assembly. The shell 28 is inserted onto the collar 23 in the angular position shown in FIG. 5 corresponding to assembly, in the absence of the blade 37 and the shims 35 and 38. The flat 40 extends beyond the projections 25 due to the straight portions 41, which makes this insertion operation possible. The shell 28 is then turned slightly to put it into the position shown in FIG. 4, in which accesses to the groove 18 are clear. The locking shim 35 is slid from below into the notches 26, the support shim 38 is inserted into the drilling 37, and then the root of the blade 27 is inserted into the groove 18, sliding on the locking shim 35 until stopping in contact with the locking shim 35. An inverse rotation of the shell 28 brings the small cleat 30 immediately in front of the end of the locking shim 38, and the large cleat 31 in front of the opposite opening on the groove 18. The root of the blade 27 is then held in groove 18 with little clearance between the cleat 31 and the locking shim 35 that are at fixed positions, and little clearance also in the direction of the pivot axis because the support shim 38 holds it in contact with the top of the groove 18. The support shim 38 prevents the locking shim 35 from dropping, and the cleat 30 bearing on the support shim 38 prevents its extraction outside the groove 18 even when it only occupies a small part of the section of the groove 18.

Figure 8:
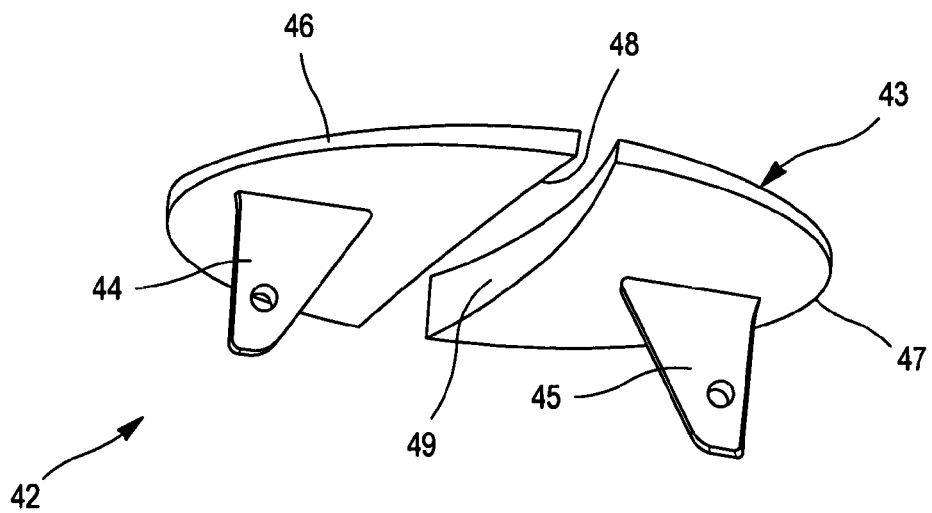

The device also comprises two approximately semi-circular half-platforms 42 and 43 and each fitted with a lower tab 44, 45. They are shown in FIG. 8. The assembly of the device is completed by installing bearing faces for tabs 44 and 45 on the tabs 19 and 20 respectively, before installing the bolts 34, the tabs 44 and 45 also being provided with drillings, in line with the previous drillings. The half-platforms 42 and 43 are similar with in particular circular outer edges and 47 forming part of a single circle in the assembled state, but different inner edges 48 and 49 so that they can adjust to the intrados and extrados respectively of the blade 27. It is thus possible to maintain continuity of the gas flow stream around the blade 27. This also explains why the half-platforms 42 and 43 are slightly curved inwards and their thickness is not uniform.

Figure 9:
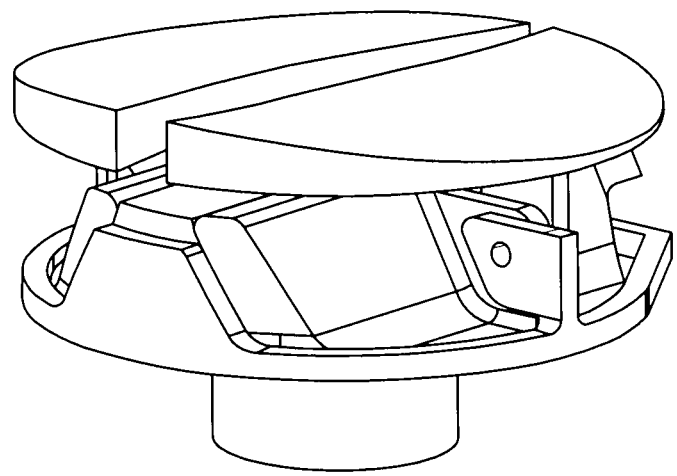
Figure 10:
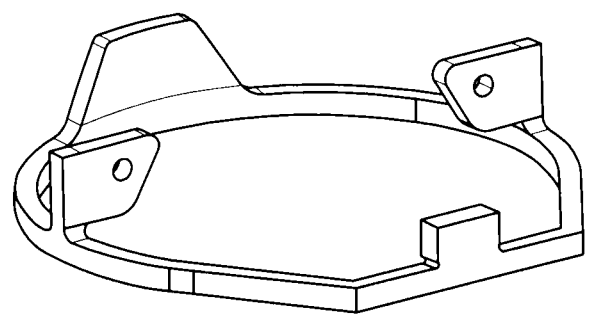

The completely assembled device is shown in FIG. 9. The isolated shell is shown in FIG. 10.

The invention claimed is:

1. A variable pitch blade device comprising a blade, a pivot including a groove, a root of the blade being mounted in said groove, and means of retaining the root of the blade in the groove, wherein said means comprise shims inserted in the groove and that stop in contact with the blade root, and a shell inserted around the pivot and provided with attachment points to the pivot, and facing cleats closing the groove.

2. The device according to claim 1, wherein the shell is approximately circular in shape and is provided with a flat on which one of the cleats is installed.

3. The device according to claim 1, wherein the shims include a retaining shim for preventing the root of the blade from sliding in the groove, and a blade root support shim placed on the bottom of the groove.

4. The device according to claim 3, wherein the retaining shim for preventing sliding is retained in facing notches formed in the inner edges of the lips delimiting groove at an axial end of the groove.

5. The device according to claim 4, wherein the retaining shim for preventing sliding is composed of a plurality of materials, and at least one of these materials is capable of absorbing energy by deformation.

6. The device according to claim 5, wherein notches are arranged beyond the bottom of the groove, the support shim is placed through the retaining shim, and the support shim passes through said groove, and the support shim comprises a hook-shaped end surrounding a tab of the retaining shim and bearing on one of the cleats.

7. The device according to claim 1, wherein the attachment points to the pivot are shell tabs provided with a drilling for bolts, and the pivot comprises additional tabs, provided with faces on which the shell tabs bear.

8. The device according to claim 7, further comprising half platforms each comprising a portion of a circular edge and a bearing edge bearing in contact with the blade, and a tab provided with drilling for bolts and a face bearing in contact with the additional tabs.

* * * * *

UNITED STATES PATENT AND TRADEMARK OFFICE
CERTIFICATE OF CORRECTION

| | | |
|---|---|---|
| PATENT NO. | : 8,651,821 B2 | Page 1 of 1 |
| APPLICATION NO. | : 13/002437 | |
| DATED | : February 18, 2014 | |
| INVENTOR(S) | : Daniel Dao et al. | |

It is certified that error appears in the above-identified patent and that said Letters Patent is hereby corrected as shown below:

In the Specification

Column 3, line 35, change "cleats 30 and are" to --cleats 30 and 31 are--;

Column 4, line 11, change "edges and 47" to --edges 46 and 47--;

In the Claims

Column 4, line 38, change "edges of the lips" to --edges of lips--; and

Column 4, line 38, change "groove at an" to --groove at the--.

Signed and Sealed this
First Day of July, 2014

Michelle K. Lee
*Deputy Director of the United States Patent and Trademark Office*